United States Patent Office 3,839,459
Patented Oct. 1, 1974

3,839,459
HYDROFORMYLATION PROCESS UTILIZING HOMOGENEOUS CUPROUS CHLORIDE COMPLEXES AS CATALYSTS
Richard H. Bennett and William R. Deever, Richmond, Va., assignors to Texaco Inc., New York, N.Y.
No Drawing. Filed Dec. 28, 1970, Ser. No. 102,168
Int. Cl. C07c *45/08*
U.S. Cl. 260—604 HF        1 Claim

ABSTRACT OF THE DISCLOSURE

This invention relates to processes for converting alpha olefin molecules such as 1-octene and their homologues to their hydroformylated derivatives utilizing metal complexes of copper as homogeneous catalytic agents.

This invention concerns a process for catalyzing the addition of carbon monoxide and hydrogen to olefinic molecules using homogeneous copper complexes as the catalytic entities.

More particularly, this invention relates to processes for hydroformylating alpha-olefins predominantly to products possessing aldehyde groups.

BACKGROUND OF THE INVENTION

It is well known that the addition of carbon monoxide and hydrogen to olefinic substrates using an appropriate catalyst system at elevated temperatures and/or elevated pressures results in the production of predominantly aldehydes, often accompanied by lesser quantities of saturated alcohols and alkanes. Typically, the hydroformylation utilized homogeneous catalyst systems illustrated by cobalt, iron and nickel complexed with ligands such as phosphines, arsines, stibines and the like.

Homogeneous catalysts are generally preferable to heterogeneous catalysts (typified by finely divided collodial solids such as activated nickel, platinum, palladium with or without an inert support) since they tend to favor one phase reaction systems which more readily facilitate more complete and rapid reactions between the unsaturated olefinic substrate and the carbon monoxide and hydrogen as well as good selectivity to produce the desired products. In addition, homogeneous catalysts are less likely to poisoning which requires replacement or regeneration of the catalyst.

Recently the applicants have developed homogeneous copper complexes which are effective in catalyzing the addition of carbon monoxide and hydrogen to olefins, particularly "alpha" olefins, giving predominantly aldehyde derivatives. These copper (I) complexes[1] not only exhibit moderately effective catalytic activity in the conversion of olefins to their hydroformylated derivatives but, in addition, they also demonstrate good selectivity. Further, they can be readily prepared in a high state of purity, either *in situ* or prior to use. In the former case, the *in situ* preparation obviates the need for isolation. In addition, the novel copper containing catalysts are utlizable at low catalyst to olefin ratios, and are capable of functioning at relatively moderate conditions of temperature and pressure in the presence of relatively wide hydrogen to carbon monoxide ratios.

In practice, each mole[2] of alpha olefin to be hydroformylated to prdouct is contacted and admixed with the following components in a substantially anhydrous and oxidizer-free environment to form a reaction mixture comprising, in addition to the alpha olefin, the following components:

(a) at least 0.02 moles[2] of a cuprous halide complexed with a ligand containing as its essential parts at least one organic radical (to be defined below) linked to or bonded to at least one element selected from Group Va of the Periodic Table,[3] then said reaction mixture is:

(b) heated to at least 100° C. under superatmospheric pressure ranging from 500 p.s.i.g. and upwards, supplied by a hydrogen-carbon monoxide mixture comprising a hydrogen to carbon monoxide mole ratio ranging from about 1 mole of hydrogen to 1 mole of carbon monoxide to 10 moles of hydrogen to 1 mole of carbon monoxide, and (c) continuing said heating of the reaction mixture under the above conditions of heat and pressure, until hydroformylation, as evidence by a substantial pressure drop in the system, the alpha olefin takes place and separating the products contained therein.

In the preferred practice, each mole of alpha olefin substrates containing from 3 to 20 carbon atoms to be hydroformylated to aldehyde products is contacted with, and admixed with, the following components in a substantially anhydrous and oxidizer-free environment, to form a reaction mixture comprising, in addition to the alpha o'efin, the following components:

(a) from about 0.001 to 0.1 moles of cuprous chloride complexed with a ligand containing as its essential parts at least one organic radical (defined *infra*) linked to or bonded to an element selected from phosphorus, arsenic and mixtures thereof, then said reaction mixtures is, (b) heated between about 125° to 175° C. under superatomspheric pressure, ranging from 700 p.s.i.g. to about 1500 p.s.i.g. and upwards, supplied by a hydrogen-carbon monoxide mixture comprising a hydrogen to carbon monoxide mole ratio ranging from about 1 mole of hydrogen to 1 mole of carbon monoxide, to 2 moles of hydrogen to 1 mole of carbon monoxide, and (c) continuing said heating of the reaction mixture under the above conditions of heat and pressure, until hydroformylation, as evidenced by a substantial pressure drop in the system, of the alpha olefin takes place and separating the products contained therein.

In order to aid in the full understanding of the inventive process the following additional disclosure is submitted:

A. Homogeneous Cuprous Halide Complex Catalysts

As described earlier, the catalysts of this invention can be most broadly described as being cuprous halide complexes of esters of trivalent acids of phosphorus, arsenic and antimony wherein the ester moieties are derived from the group of alcohols, diols and/or triols of the aliphatic, aryl, alkylated aryl and alicyclic type.

While all of the above class of catalysts are useful, as is the case in any broad group, some members of a narrower group or class contained within the broader class are preferred for various reasons to the entire class. In the instant case the favored group of cuprous halide complexes are within the formula:

wherein X is a halogen consisting of the preferred halogen chlorine and bromine or iodine and L comprises either:

(a) a polycyclic heterocyclic ester or an alkylated polycyclic heterocyclic ester most favorably containing 1 to

---

[1] Complexes as used throughout this specification and/or claims means a coordination compound formed by the union of one or more electronically rich molecules or atoms capable of independent existence with one or more electronically poor molecules or atoms, each of which is capable of independent existence.

[2] Or a proportional fraction or multiple thereof.
[3] As defined on page 54 of the seventh edition of Lange's Handbook of Chemistry, except that the elements nitrogen and bismuth are excluded.

6 arbon atoms in the alkylating group and 6 atoms in each ring, wherein the hetero atom is an element selected from phosphorus and arsenic, or (b) where L is [(DO)₃Z] wherein D, which can be the same or different at any given time, is selected from phenyl (Ph), alkylated phenyl, wherein the alkylating group contains 1 to 6 carbon atoms, and aliphatic radicals wherein the alkyl group contains 1 to 10 carbon atoms, and Z is phosphorous or arsenic and $n$ is an integer ranging from 1 to 3.

The preferred cupous halide catalysts are the cuprous chloride phosphite complexes selected from the group consisting of $CuClP(OC_6H_4R)_3$, and $CuClP(OCH_2)_3CR$ wherein R is either an alkyl radical containing 1 to 6 carbon atoms or a hydrogen atom. Specific compounds within the preferred group are: $CuClP(OC_6H_5)_3$, $CuClP(p-OC_6H_4CH_3)_3$, $CuClP(OCH_2)_3CCH_3$ and $CuClP(OCH_2)_3CC_2H_5$.

The general method for the preparation of these known cuprous complexes, which, to the best of the applicants' knowledge are novel as hydroformylating agents, is reported in the technical and patent literature.

The general method for the preparation of the cuprous catalyst complexes as typified by $CuClP(OPh)_3$ is to reflux molar equivalents of anhydrous cuprous chloride and the ligand in inert solvent or solvents such as benzene, toluene, etc. for at least 12 hours until the complex either appears as a white insoluble solid, or where soluble in the aromatic diluent, "salts" out by the addition of an inert hydrocarbon such as pentane or hexane in which they are much less soluble.

The following organophosphites are illustrative of co-reactants of the cuprous halides such as cuprous chloride: triphenylphosphite, tri-p-tolylphosphite, tri-m-tolylphosphite, trimethylphosphite, triethylphosphite, tri-n-propylphosphite, tri-n-butylphosphite, tri-isopropylphosphite, tri-isobutylphosphite, 2,6,7-trioxa-1-phosphabicyclo[2.2.2.]octane, 4-methyl-2,6,7-trioxa-1-phosphabicyclo[2.2.2.]octane, 4-ethyl-2,6,7-trioxa-1-phosphabicyclo[2.2.2.]octane, 2,8,9-trioxa-1-phosphatricyclo[3.3.1.1.$^{3,7}$]decane, as well as the corresponding arsenic and antimony organo compounds.

B. Alpha Olefins

As defined herein, the substrates of this invention include 1-butene, 1-hexene, 1-heptene, 1-octene, 1-nonene, 1-decene, 1-undecene 1-dodecene as well as mixtures of these alpha olefins. The olefins can be employed in the form of single, neat, discrete compounds or mixtures of these compounds. These olefins can contain substantial quantities of inert solvent or solvents such as the alkyl ethers, aromatics and alkanes.

C. Reaction Conditions Required

Generally speaking, in order to consistently obtain high conversions of unsaturated organic olefin a certain combination of reaction parameters is required. These include a substantially anhydrous, oxidizing agent-free medium in a pressurized system supplied by dry carbon monoxide and hydrogen, in the presence of at least a catalytic amount of at least one of the cuprous halide complex catalysts. This minimal combination of reaction conditions is referred to as hydroformylating environment.

(1) Temperature.—As might be expected, the temperature required in the pressurized system is a variable, dependent upon the pressure utilized, the ratio of hydrogen to carbon monoxide, and the alpha olefin among other variables. For this reason precise statements are difficult to make; however, when the preferred catalyst such as $CuClp(OPh)_3$ is employed in at least catalytic quantities in a pressurized system ranging from about 500 p.s.i.g. and upwards, a temperature from about 100° C. to about 250° C. is operable with consistently good yields of the hydroformylation product being obtained within a narrower but preferred range of about 125° to 175° C.

(2) Pressure.—When using at least catalytic quantities of the $CuClP(OPh)_3$ catalyst and reaction temperatures ranging from 125° C. and upwards, and substrates such as 1-octene, superatmospheric pressures ranging from 500 p.s.i.g. and upward, particularly from 700–1100 p.s.i.g., are preferred. Lower pressures may adversely effect reaction time and yields but much higher pressures would require greater expenditures on equipment without any concomitant advantage.

(3) Ratio of catalyst to alpha olefin is generally not critical and may vary widely within the scope of the invention. It may be controlled to obtain a preferred homogeneous reaction mixture therefore obviating the need for solvents or diluents. Empirically it has been found that large molar excesses of olefin to homogeneous copper complex are favored. Significant yields are obtained under most conditions when the mole ratio of olefin to catalyst ranges between 1000:1 to 10:1 with consistently good yields being obtained at mole ratios ranging from 100:1 to 15:1. In view of this, the latter range represents the preferred ratio; the former ratio range is referred to as a catalytic amount of catalyst.

(4) Ratio of hydrogen to carbon monoxide may also vary widely within the operable scope of the hydroformylation process. Suitable results have been obtained within mole ratios of hydrogen to carbon monoxide varying from between 0.5:1 to 20:1 with the most consistent results obtained between 1 ot 3 moles of hydrogen to carbon monoxide. When aldehydes are the preferred product the latter ratio more closely resembles that of stiochiometry, that is 1 mole of hydrogen to 1 mole of carbon monoxide.

(5) Reaction times are also variable and are empirically derived. In most instances a substantial drop of pressure signals the termination of the reaction. Alternatively, the reaction may be monitored by withdrawing increments at periodic intervals and folowing the conversion by GLPC, IR and the like. Usually, at least 12 hours are required for substantial hydroformylation with 10 to 36 hours representing the operable extremes.

D. Methods of Utilizing Hydroformylation Catalysts

Generally, two options can be used to prepare the complex; at the time of use (*in situ*) without isolation, or alternatively to prepare the catalyst in advance prior to use and store it until needed. In the latter case the catalyst complex is added as either an anhydrous solid or as an anhydrous solution. The cuprous complex with the other reaction components is added to a reactor capable of being pressurized (such as an autoclave), preferably a glass or ceramic lined reactor. The reaction charge, which may already contain the alpha olefin substrate dissolved in optional, inert solvent or the olefin substrate, may be added near, or in solution subsequent to introduction of catalyst. In either method the reaction system should be flushed free of oxygen, air or other sources of oxidation, most conveniently through the introduction of a hydrogen, nitrogen, argon or any other inert gas or mixture of gases to flush the system. Then, after the exclusion of air or oxidizing agents is assured, the reaction mixture is pressurized in a stirred reactor. The reactor is equipped with heating and stirring means and a means for introducing the required hydrogen and carbon monoxide gases to the system prior to or during pressurization. After a significant pressure drop is noted or analytical monitoring indicates maximum hydroformylation has taken place, the reactor is cooled, bled of excess pressure and the contents removed and the aldehyde product separated from contaminants or side products. Catalytic activity is observed in a stainless steel reactor although a glass-lined or ceramic-lined reactor is preferred.

Having described the inventive process in general terms, the following embodiments and examples are submitted to illustrate specific but non-limiting aspects of the inventive concept. Unless specified otherwise, all parts and percentages are by weight rather than by volume and all degrees are in centigrade rather than in Fahrenheit.

EMBODIMENT A

Preparation of CuClP(OPh)$_3$

Molar equivalents of anhydrous CuCl and triphenylphosphite are reacted in refluxing heptene for 12 hours. The insoluble white solid product which forms is isolated, washed with n-pentane and dried before use. Elemental analysis, melting points and infrared analysis confirm that the expected product is obtained.

EMBODIMENT B

Preparation of CuClP(OCH$_2$)$_3$CCH$_3$

Molar equivalents of anhydrous CuCl and 4-methyl-2,6,7-trioxa-1-phosphabicyclo[2.2.2.]octane are reacted in 100 parts by volume of refluxing benzene for 12 hours. The product chloro(4-methyl-2,6,7-trioxa-1-phosphabicyclo[2.2.2.]octane)copper (I) is isolated as a white, benzene-insoluble solid, which, in the dry state, is confirmed by analytical methods to be the expected product.

EMBODIMENTS C-D

Preparation of other cuprous homogeneous catalysts

Using equimolar quantities of the indicated ligand, anhydrous CuCl and 100 parts by weight of refluxing inert solvent, the following catalysts are prepared, isolated, dried and analysed as in the preceding embodiments.

| Embodiment | Ligand | Copper Complex |
|---|---|---|
| C | P(p-OC$_6$H$_4$CH$_3$)$_3$ | CuClP(p-OC$_6$H$_4$CH$_3$)$_3$ |
| D | P(OCH$_2$)$_3$CC$_2$H$_5$ | CuClP(OCH$_2$)$_3$CC$_2$H$_5$ |

EXAMPLE 1

Hydroformylation of 1-octene using CuClP(OCH$_2$)$_3$CCH$_2$CH$_3$.

A charge comprising 100 ml. of anhydrous benzene, which had been flushed thoroughly with hydrogen, 1.0 millimoles of CuClP(OCH$_2$)$_3$CCH$_2$CH$_3$ (catalyst concentration $10^{-2}$M) and 20.0 millimoles of 1-octene is added, with the exclusion of air, to a glass-lined one-liter autoclave capable of being pressurized, heated, cooled, and stirred. The autoclave is pressurized to 800 p.s.i.g. with a 1:1 ratio of hydrogen and carbon monoxide and heated at 150° C. for 17 hours. GLPC analysis of the reaction solution at the end of this time indicated that the desired C$_9$-aldehyde products were formed. The ratio of 1-nonanal to 2-methyl-1-octanal is 2.4 to 1.0.

A duplicate run made on 1-hexene using the same reactor, reaction conditions and catalyst indicates that a comparable yield of C$_7$-aldehyde product is obtained.

EXAMPLES 2 to 5

Hydroformylation of 1-octene to C$_9$-aldehydes using the catalysts of embodiments B, C and D.—Using the same techniques, autoclave, the indicated catalysts and 150–175° C. reaction temperatures for 20–24 hours under 1000 p.s.i.g. and a 1:1 ratio of hydrogen to carbon monoxide, the copper catalysts whose preparation is disclosed in Embodiments B to D are used to hydroformylate 1-octene to C$_9$-aldehydes. In all instances comparable yield to those in Example 1 are obtained.

As the previous several embodiments and examples indicate, the novel cuprous halide catalyst complexes offer an optional and sometimes advantageous class of homogeneous catalysts. For example, the catalysts employed in the inventive process are readily available known compounds which can be prepared in good yield from well documented preparations in both the technical and patent literature.

In addition, reaction temperatures are relatively mild and while a pressurized system is required, reaction times are relatively rapid and the products are prepared relatively free from contaminants.

Finally, numerous modifications and substitutions may be made without departing from the inventive concept. For instance, while cuprous halide salts must be employed, the halide may be varied and many different aliphatically and/or aromatically linked ligands containing phosphorus, arsenic and the like as a Group Va element, may be used.

However, the metes and bounds of this invention are best gleaned by the claims which follow, read in conjunction with the preceding specification.

What is claimed is:

1. A process for producing hydroformylated products from a 1-alkene olefin substrate containing from 3 to 20 carbon atoms, consisting essentially of:
    (a) admixing each mole of said substrate to be hydroformylated in a substantially anhydrous, oxidizer-free reaction inert solvent environment with from about 0.001 to 0.1 moles of cuprous chloride catalyst complex selected from the group consisting of CuClP(phenoxy)$_3$,
    CuClP(OCH$_2$)$_3$CCH$_3$,
    CuClP(p-tolyloxy)$_3$ and CuClP(OCH$_2$)$_3$CC$_2$H$_5$, until a reaction mixture is formed;
    (b) heating said reaction mixture at temperatures ranging from about 150° C. to about 175° C., in a pressurized system ranging from about 700 p.s.i.g. to 1500 p.s.i.g. supplied by hydrogen and carbon monoxide gases, said hydrogen being present in a mole ratio ranging from 1 mole to 2 moles for each mole of carbon monoxide, and
    (c) continuing said heating of the said reaction mixture under said conditions of temperature and pressure until hydroformylation of the 1-alkene substrates takes place and separating said hydroformylation products contained therein.

References Cited

FOREIGN PATENTS

| 1,534,510 | 6/1968 | France | 260—604 HF |
| 631,316 | 11/1949 | Great Britain | 260—604 HF |
| 988,941 | 4/1965 | Great Britain | 260—604 HF |

OTHER REFERENCES

Nishizawa, Y. Chemical Abstracts, Vol. 56, column 11429–11430, 1962.

BERNARD HELFIN, Primary Examiner

R. H. LILES, Assistant Examiner